United States Patent
Chang et al.

(10) Patent No.: US 9,088,830 B2
(45) Date of Patent: Jul. 21, 2015

(54) METHOD FOR VIRTUAL CHANNEL MANAGEMENT, NETWORK-BASED MULTIMEDIA REPRODUCTION SYSTEM WITH VIRTUAL CHANNEL, AND COMPUTER READABLE STORAGE MEDIUM

(71) Applicant: Wistron Corporation, New Taipei (TW)

(72) Inventors: Hui-Liang Chang, New Taipei (TW); Li-Hsuan Chen, New Taipei (TW); Ching-Yuan Chuang, New Taipei (TW); Po-Hsu Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 13/958,709

(22) Filed: Aug. 5, 2013

(65) Prior Publication Data
US 2014/0259075 A1    Sep. 11, 2014

(30) Foreign Application Priority Data
Mar. 11, 2013  (TW) .............................. 102108478 U (51) Int. Cl.
*H04N 5/445*  (2011.01)
*H04N 21/482*  (2011.01)
*H04N 21/2668*  (2011.01)
*H04N 21/61*  (2011.01)

(52) U.S. Cl.
CPC ....... *H04N 21/4828* (2013.01); *H04N 21/2668* (2013.01); *H04N 21/482* (2013.01); *H04N 21/4825* (2013.01); *H04N 21/6125* (2013.01)

(58) Field of Classification Search
USPC ................ 725/39, 40, 46, 48, 53, 74, 86
See application file for complete search history.

(56) References Cited

U.S. PATENT DOCUMENTS

| 8,484,692 B2 | 7/2013 | Brogan |
| 2004/0205816 A1 | 10/2004 | Barrett |

(Continued)

FOREIGN PATENT DOCUMENTS

| JP | 2004320768 | 11/2004 |
| JP | 2010531625 | 9/2010 |

(Continued)

OTHER PUBLICATIONS

EP Search Report dated Feb. 7, 2014.
(Continued)

*Primary Examiner* — Jivka Rabovianski
(74) *Attorney, Agent, or Firm* — McClure, Qualey & Rodack, LLP (57) ABSTRACT

Method for virtual channel management, in an embodiment, includes the following steps. A command including a keyword is detected. Searching local program data for any program satisfying a first search criterion which includes the keyword is made to obtain a local search result, and searching for any external network video content satisfying the first search criterion is made to obtain an external search result. A program list is generated with a combination of the local and external search results. The program list is presented. If a selection indicating virtual channel addition is detected during the presenting of the program list, the program list is set to be a virtual channel associated with a channel identity code, and program content of the virtual channel is played. While the network-based multimedia reproduction system operates, if the channel identity code is detected to be selected, the program content thereof is played.

25 Claims, 6 Drawing Sheets

(56) References Cited

U.S. PATENT DOCUMENTS

2008/0046928 A1    2/2008  Poling et al.
2008/0155059 A1*  6/2008  Hardin et al. ................ 709/218
2009/0064228 A1    3/2009  Lin
2010/0333142 A1*  12/2010  Busse et al. .................... 725/47
2011/0126232 A1    5/2011  Lee et al.

FOREIGN PATENT DOCUMENTS

| KR | 100751810 B1 | 8/2007 |
|----|--------------|--------|
| WO | 0040028 A1 | 7/2000 |
| WO | 2007056532 A1 | 5/2007 |
| WO | 2007072368 A1 | 6/2007 |
| WO | 2011146946 | 11/2011 |

OTHER PUBLICATIONS

EP Search Report dated Apr. 4, 2014.
KIPO Office Action with English translation dated Jul. 21, 2014.
JP Office Action dated Oct. 7, 2014.

* cited by examiner

METHOD FOR VIRTUAL CHANNEL MANAGEMENT, NETWORK-BASED MULTIMEDIA REPRODUCTION SYSTEM WITH VIRTUAL CHANNEL, AND COMPUTER READABLE STORAGE MEDIUM

This application claims the benefit of Taiwan application Serial No. 102108478, filed Mar. 11, 2013, the subject matter of which is incorporated herein by reference.

BACKGROUND

1. Technical Field

The disclosure relates in general to a method and apparatus for content selection of a network-based multimedia reproduction system, and more particularly to a method for virtual channel management and a network-based multimedia reproduction system with virtual channel.

2. Description of the Related Art

Transmitting videos via the broadband Internet is currently a prevalent alternative way for watching videos or television programs. To play an Internet video or browse Internet TV in a smart television, a corresponding application, which has its own user interface and way of providing contents, needs to be pre-installed or installed by a user.

Such kind of televisions are generally designed based on the ways for operating applications in personal computers so that a user for merely selecting desired contents has to look at a screen and operate a remote controller in a careful manner similar to that on a personal computer. In addition, with diversified contents and types provided by the Internet, a relaxed atmosphere of enjoying watching the television as originally intended may instead turn out to be serious and complicated. In this way, such a television causes difficulties of usage in a family or group and fails to satisfy the needs of different users, for example, those who are unfamiliar with operating a computer.

Further, the programs on the television channels are arranged by the providers, and if a user is interested in a specific topic, the user has to switch among different channels to find ones that the user wants. When the program finishes, the next program to be played may not be relevant to the topic interested, the user has to switch manually, leading to inflexibility and inconvenience in operations during viewing programs.

SUMMARY

The disclosure is directed to a method for virtual channel management and a network-based multimedia reproduction system with virtual channel.

According to an embodiment of the disclosure, a method for virtual channel management for use in an electronic device is provided. The method includes the following steps. A command including a keyword is detected. Searching local program data for any program satisfying a first search criterion is made to obtain a local search result, and searching for any external network video content satisfying the first search criterion is made to obtain an external search result, wherein the first search criterion includes the keyword. A program list is generated with a combination of the local search result and the external search result. The program list is presented on a screen of the network-based multimedia reproduction system, wherein the program list includes one or more programs satisfying the keyword. If a first selection indicating virtual channel addition is detected during the presenting of the program list, the program list is set to be a virtual channel of the network-based multimedia reproduction system, and program content of the virtual channel is played, wherein the program content of the virtual channel is content of the program(s) of the program list satisfying the first search criterion and the virtual channel is associated with a channel identity code. While the network-based multimedia reproduction system operates, if a second selection indicating selecting the virtual channel associated with the channel identity code is detected, the program content of the virtual channel is played on the screen of the network-based multimedia reproduction system.

Another embodiment provides a computer readable storage medium having stored program code of one or more program modules, which, when executed by a network-based multimedia reproduction system, causes the network-based multimedia reproduction system to perform the method for virtual channel management as above.

Further another embodiment provides a network-based multimedia reproduction system with virtual channels, which includes: a command detection unit, a display unit, a storage unit, a network unit, and a processing unit. In response to a command including a keyword, detected by the command detection unit, the processing unit is operative to search local program data for any program satisfying a first search criterion to obtain a local search result, and search for any external network video content satisfying the first search criterion to obtain an external search result, wherein the first search criterion includes the keyword. The processing unit is operative to generate a program list with a combination of the local search result and the external search result. The display unit is operative to present the program list, wherein the program list includes one or more programs satisfying the keyword. If a first selection indicating virtual channel addition is detected during the display unit presenting the program list, the processing unit is operative to set the program list to be a virtual channel of the network-based multimedia reproduction system, and the processing unit is operative to use the display unit to play program content of the virtual channel, wherein the program content of the virtual channel is content of the program(s) of the program list satisfying the first search criterion and the virtual channel is associated with a channel identity code. While the network-based multimedia reproduction system operates, if a second selection indicating selecting the virtual channel associated with the channel identity code is detected, the network-based multimedia reproduction system uses the display unit to play the program content of the virtual channel.

The above and other aspects of the disclosure will become better understood with regard to the following detailed description of the preferred but non-limiting embodiments. The following description is made with reference to the accompanying drawings.

DETAILED DESCRIPTION

Embodiments of a method for virtual channel management and a network-based multimedia reproduction system with virtual channel are provided below. For example, the network-based multimedia reproduction system is a display and/or playback system having the functionality of linking a multimedia source on the network, for example, the Internet (e.g., through wired or wireless manner), such as an Internet TV, a smart TV, a network multimedia player or device. According to some embodiments, the network-based multimedia reproduction system realizes the technology of virtual channel so that the user can activate an application (a piece of software) or switch to another application, by using operation of switching television channels, thus facilitating selection and viewing digital content for the user. In some embodiments, the user can set a virtual channel, for example, adding a virtual channel for a topic that the user is interested in; the programs (e.g., shows or videos) of the virtual channel can be further updated so that the user is able to watch those required, such as the latest content in relation to the topic which is tracked. In some other embodiments, the user can further collect various videos such as the virtual channel on a specific topic, any channel or program in a personal virtual channel.

As in the embodiments, a virtual channel corresponds to an operation mode of an application. Selecting a specific virtual channel is to activate the corresponding application (or a number of associated programs or modules) so as to display desired contents on a screen of the network-based multimedia reproduction system. In addition to an application that needs to be installed, for example, an application for watching network television, the application can be generally regarded as a request or use of a network service, for example, watching video from a video sharing website (such as YouTube), browsing emails (such as Gmail), on-line talking (such as a messaging tool), using network photo album, and so on.

Figure 1:
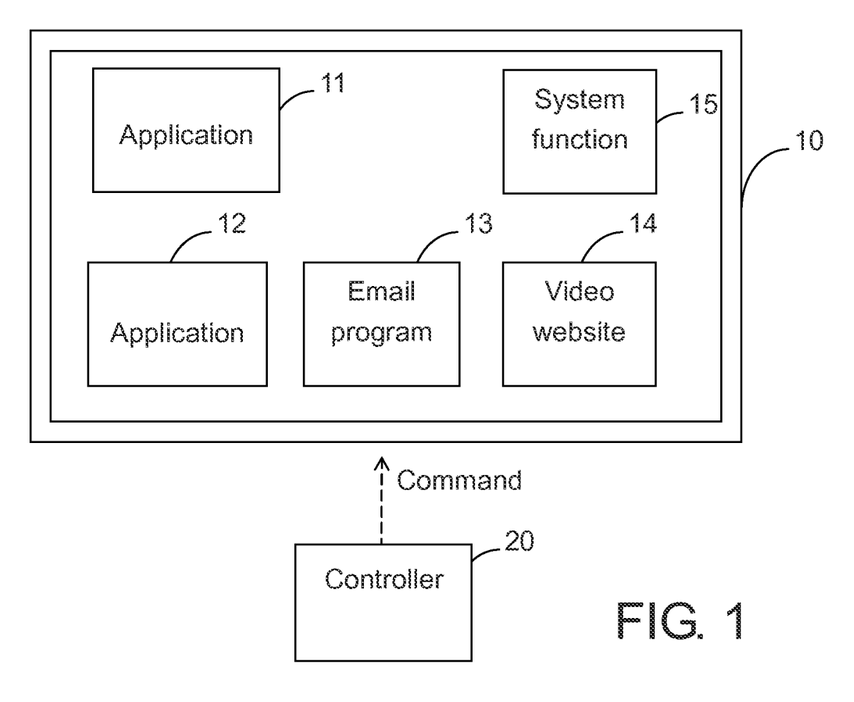
FIG. 1 is a schematic diagram of a network-based multimedia reproduction system with virtual channels that receives a command.

As illustrated in FIG. 1, a network-based multimedia reproduction system with virtual channels receives a command, wherein the network-based multimedia reproduction system can execute a plurality of applications 11 to 14 and present digital contents on the screen, for example, in full screen or other proportion. The network-based multimedia reproduction system 10 receives a command sent from a controller 20 (e.g., an electronic device such as a remote controller or a handheld device), and determines whether the command is associated with virtual channel switching. For example, a user presses a channel code 1001 for a virtual channel to indicate that the user wants to watch a particular online program using an application 11. As an example, the user presses a channel code 200 for a virtual channel to indicate that the user wants to read emails in the inbox for a particular email account with an email program 13. For another example, a channel jump or return, an input source change, a setting of a favorite channel list or an electronic program guide (EPG), performed on the controller 20 can trigger channel switching.

Figure 2:
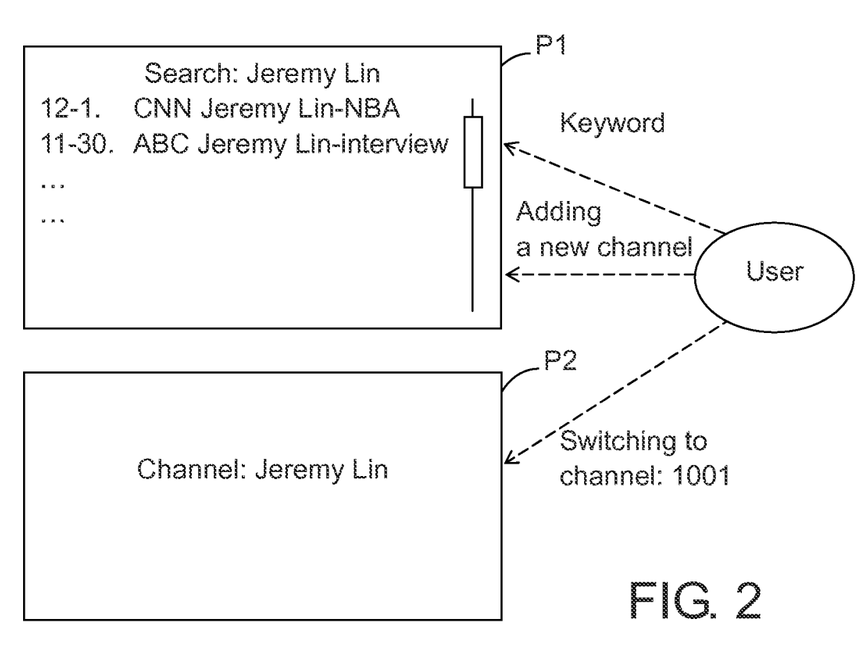
FIG. 2 is a schematic diagram illustrating addition of a virtual channel by using a network-based multimedia reproduction system.

Referring to FIG. 2, a schematic diagram illustrates the addition of a virtual channel by using a network-based multimedia reproduction system. By entering a keyword (e.g., Jeremy Lin), a user instructs the network-based multimedia reproduction system 10 to search for content about the keyword. The network-based multimedia reproduction system 10 presents the search result in the form of a program list on the screen P1 of the network-based multimedia reproduction system 10. The user indicates the addition of a virtual channel and then the network-based multimedia reproduction system 10 adds a virtual channel, makes it associated with the program list and has a channel code (e.g., numeral 1001 or other representing code). From this on, the user can use the way of switching television channels, for example, entering a channel code 1001, as illustrated in FIG. 2, to instruct the network-based multimedia reproduction system to play the content of the virtual channel. In addition, the network-based multimedia reproduction system 10 can further update the programs (e.g., shows or videos) of the virtual channel so that the user is able to watch those required, thus helping the user to keep track with the latest content on the topic. The related embodiments will be provided below in detail.

Figure 3:
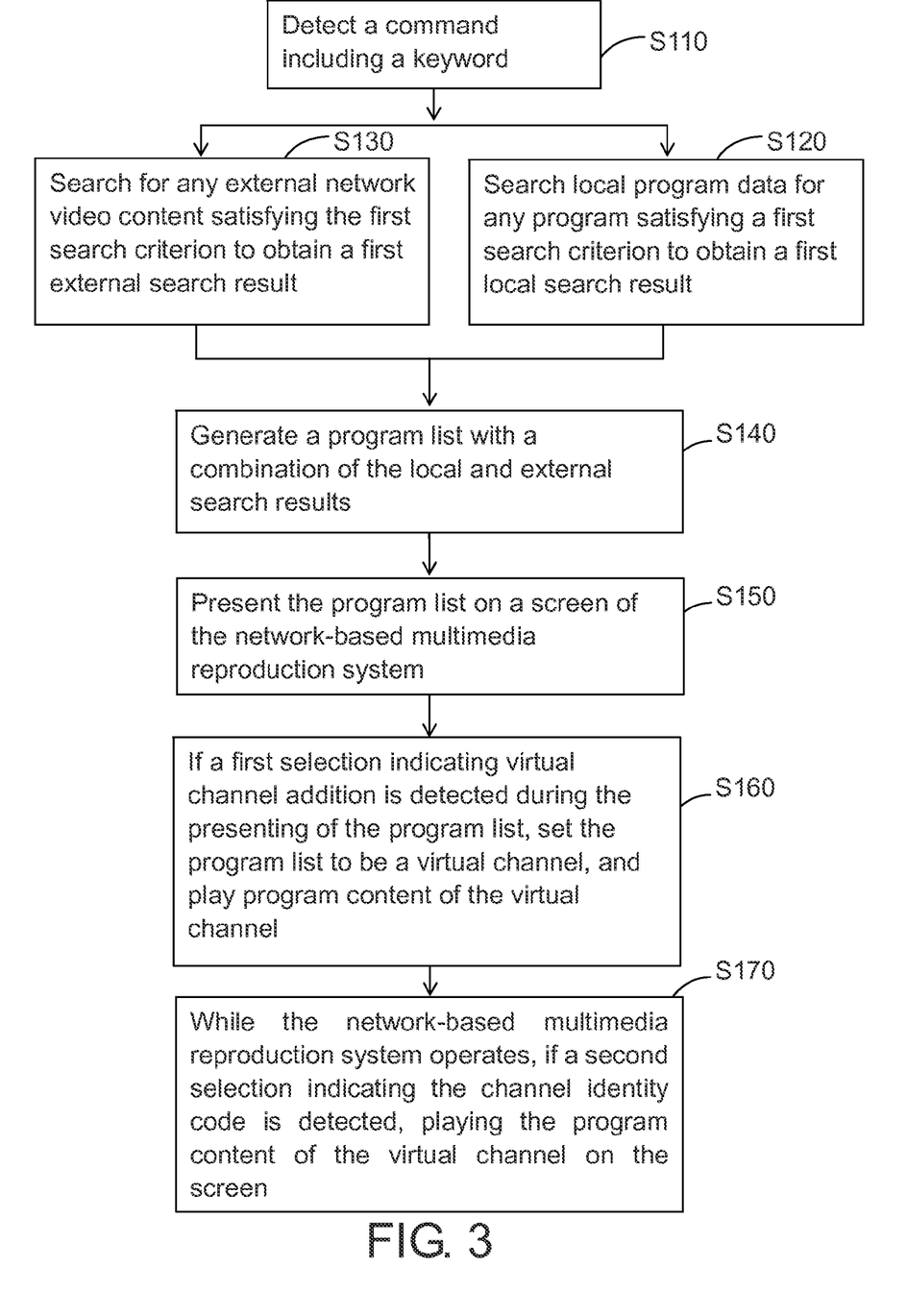
FIG. 3 is a flowchart of an embodiment of a method for virtual channel management.
Figure 4:
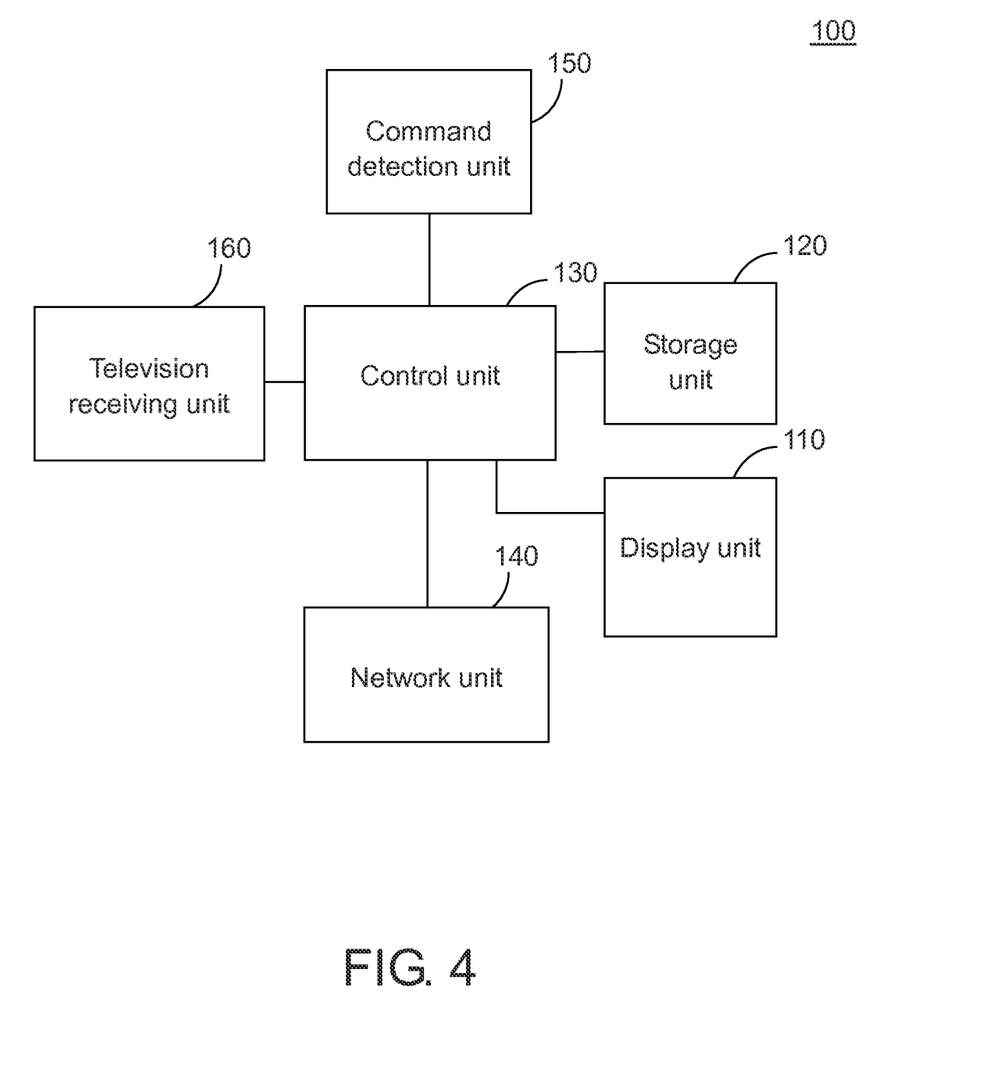
FIG. 4 is a block diagram illustrating an embodiment for a basic structure of a network-based multimedia reproduction system.

FIG. 3 illustrates a flowchart of an embodiment of a method for virtual channel management. FIG. 4 illustrates an embodiment for a basic structure of a network-based multimedia reproduction system in a block diagram. As shown in FIG. 4, the network-based multimedia reproduction system 100 includes a display unit 110, a storage unit 120, a processing unit 130, a network unit 140, and a command detection unit 150, wherein the processing unit 130 is coupled to the display unit 110, the storage unit 120, the network unit 140, and the command detection unit 150. Depending on design requirements, the network-based multimedia reproduction system 100 may further include other devices: for example, a television receiving unit 160 which including such as an analog or digital television tuner, and signal processing circuit. The command detection unit 150, for example, is physical keys, a receiver for a wired or wireless remote controller, and/or a detection device for voice recognition, video recognition such as facial recognition, or gesture recognition. In addition, when the network-based multimedia reproduction system 101 is realized as a network-based multimedia player, the display unit 110 can be implemented by a display screen integrated with the network-based multimedia player or regarded as a display screen connected to the network-based multimedia player in a wired or wireless manner. Hence, the ways of implementation of the network-based network-based multimedia reproduction system 101 is not limited to the system of FIG. 4 and the following description with reference to this structure is merely for the sake of explanation.

Referring to FIG. 3, the method for virtual channel management includes the following steps.

As shown in step S110, detecting a command including a keyword is performed, for example, by the command detection unit 150, wherein the keyword may be a letter(s), word(s), phrase(s), or sentence(s). For example, the command detection unit 150 detects a detection signal including the keyword entered by using the remote controller. In another example, the command detection unit 150 detects a sound from the user indicating the keyword or a command represented by the movement of the user's hand, face, or other part of the body.

The processing unit 130, in response to the command including the keyword detected by the command detection unit 150, as shown in step S120, is operative to search local program data for any program satisfying a first search criterion to obtain a first local search result. As shown in step S130, searching for any external network video content satisfying the first search criterion is made by the network unit 140 to obtain a first external search result, wherein the first search criterion includes the keyword. In addition, steps S120 and S130 can be performed at the same time or in different order, and their implementation is not limited thereto.

As illustrated in step S140, the processing unit 130 is operative to generate a program list with a combination of the first local search result and the first external search result.

As shown in step S150, the program list is presented on a screen of the network-based multimedia reproduction system 100, for example, on the display unit 110. The program list includes one or more programs satisfying the keyword, for example, the list illustrated on the screen P1 of FIG. 2.

During the presenting of the program list, if a first selection indicating virtual channel addition is detected, for example, by using the command detection unit 150, then the processing unit 130 is operative to set the program list to be a virtual channel (or called virtual television channel) of the network-based multimedia reproduction system 100 and play program content of the virtual channel on the screen. The program content of the virtual channel is content of the program(s) of the program list satisfying the first search criterion and the virtual channel is associated with a channel identity code (e.g., 1001 or code formed by any letter of the alphabet and/or any number).

After that, as shown in step S170, while the network-based multimedia reproduction system 100 operates, if a second selection indicating selecting the virtual channel associated with the channel identity code is detected by the command detection unit 150, then the program content of the virtual channel is played on the screen, as illustrated in the screen P2 of FIG. 2.

The above embodiment of the method for virtual channel management is used for managing the content of virtual channels of the network-based multimedia reproduction system 100. In this way, the user can add a virtual channel on a topic in which the user is interested.

In steps S120 and S130, the first search criterion can further include other data for searching, for example, including at least one providing entity (i.e., its signature, name, identity and so on), for example, a video content provider, an author of a video content, or a reporter for a video content. Further, the first search criterion is not limited thereto and can include a keyword and other data, for example, the time of provision or the time length of the content and so on, for searching.

Besides, the local program data can be exemplified by a set of program attribute data, implemented by a database and stored by the storage unit 120. Each piece of program attribute data can be expressed in a data structure with a plurality of attributes such as video source, length, and so on, for a specific video (or digital content). For instance, Table 1 lists a piece of program attribute data with attributes as follows:

TABLE 1

| | Type | |
|---|---|---|
| | Program attribute data | Channel attribute data |
| Attribute | Program identity code | Channel identity code |
| | Associated channel identity code | Keyword |
| | Title | Title |
| | Description | Description |

TABLE 1-continued

| | Type | |
|---|---|---|
| | Program attribute data | Channel attribute data |
| | Length | Length |
| | Type | Type |
| | Resolution | Providing entity |
| | Providing entity | Channel sequence |
| | Time issued | |
| | Video link | |

In step S120, the first local search result is a set of pieces of program attribute data satisfying the first search criterion. In step S130, the external network video/audio contents satisfying the first search criterion include link indications (such as URLs or IP addresses or other manner of addressing) and their attributes of videos (or digital contents) found by searching a video providing platform (such as one or more websites) or a search engine website(s) which the network-based multimedia reproduction system 100 can link through a wired or wireless network. The network-based multimedia reproduction system 100 stores the data for the programs of the first external search result in the storage unit 120, for example, in the data format of the program attribute data. In an example, the data for the programs of the first external search result are regarded as an addition to the addition to the local program data and stored in a local database, for used in playing.

In step S150, the combination of the first local search result and the first external search result and the generation of the program list can be performed according to the users' ways or favorite setting, and/or the purpose of providing the latest, closely related items satisfying the first search criterion. For example, arrangement can be performed in some kind of sequence, such as times of issue, degrees of association, or length of videos in time.

As an example for step S160, the virtual channel is set to correspond to (or associated with) a piece of channel attribute data including a corresponding channel identity code and a keyword, such as the channel attribute data as exemplified in Table 1. The programs of the program list satisfying the keyword are associated with a plurality of pieces of program attribute data of the network-based multimedia reproduction system 100. When the program list is set to be a virtual channel of the network-based multimedia reproduction system 100, the pieces of program attribute data each are set to include the channel identity code. Taken Table 1 for example, after the addition of a virtual channel, a field "channel identity code" of the piece of channel attribute data is set to a code, say, 1111, and the programs of the virtual channel has their "associated channel identity code" of the same code, say, 1111. In this way, the channel attribute data for a virtual channel are associated with the program attribute data for one or more programs.

Figure 5:
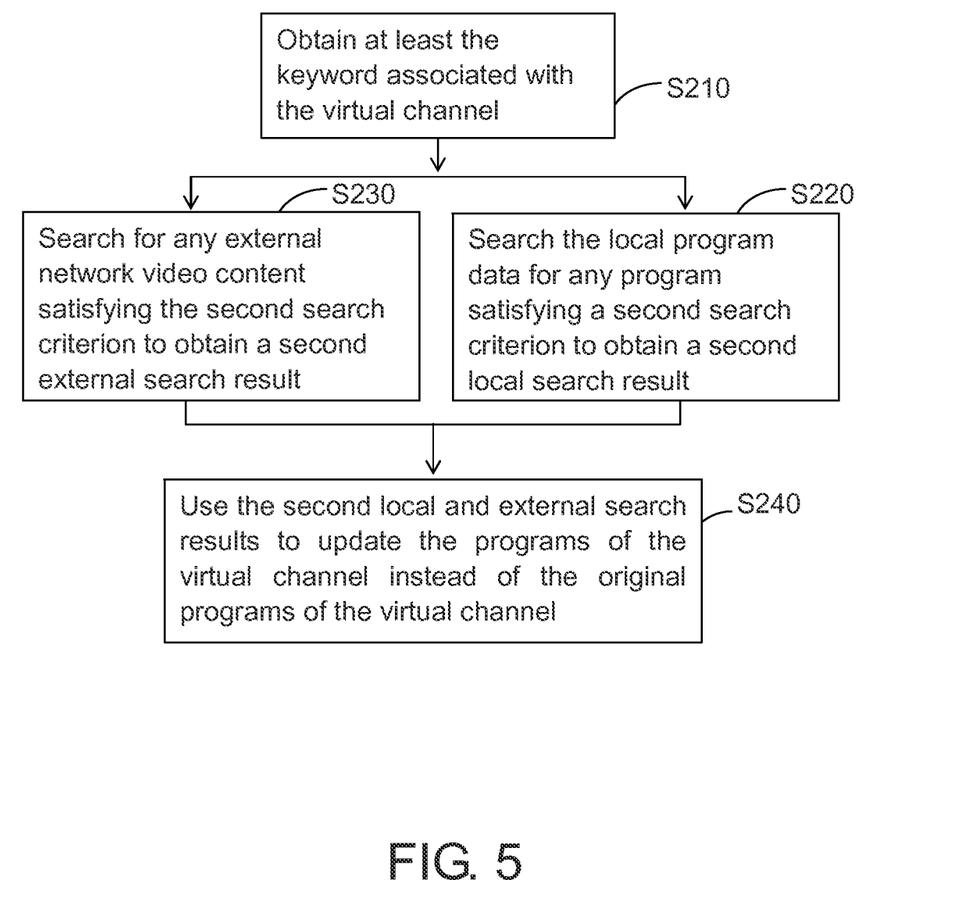
FIG. 5 is a flowchart of another embodiment of a method for virtual channel management.

In addition, in some embodiments, the virtual channel set by using the embodiment of FIG. 3 can be further updated so as to track the latest content on the interested topic. Referring to FIG. 5, a flowchart illustrates another embodiment of a method for virtual channel management. Steps S210-S240 of FIG. 5, for example, are executed by the processing unit 130 of the network-based multimedia reproduction system 100 in response to an update event. The update event, for example, is an update event triggered internally by the network-based multimedia reproduction system 100 at regular times, or an update event triggered by way of selection for update by the user. The method of FIG. 5, for example, is executed for update with respect to a virtual channel in the background by the network-based multimedia reproduction system while playing some other channel or program. In this way, when the user switches to the virtual channel, the user can view the updated program content, instead of the same content being viewed previously.

As illustrated in step S210, at least the keyword associated a specific virtual channel is obtained, for example, by acquiring the content of the field "keyword" of a piece of channel attribute data for the virtual channel.

As shown in step S220, the local program data is searched for any program satisfying a second search criterion to obtain a second local search result. Searching for any external network video content satisfying the second search criterion is made, as shown in step S230, to obtain a second external search result. The second search criterion includes the keyword. In other examples, the second search criterion may be the same as the first search criterion; or the second search criterion may further include attribute of one or more fields of the corresponding channel attribute data, as above examples of steps S120 and S130. In addition, in some embodiments, in course of updating according to an embodiment of FIG. 5, a search criterion for searching can be submitted in the same or different criterion according to the favorite of the user or other requirement, thus leading to appropriate search result.

As shown in step S240, the programs of the virtual channel are updated with the second local search result and the second external search result, instead of the original programs of the virtual channel, wherein each piece of program attribute data of the programs of the virtual channel is set to include the channel identity code. For example, the field of "associated channel identity code" is set to the channel identity code. In addition, in the course of updating channel, the network-based multimedia reproduction system 100 can store the programs of the virtual channel in the same data format for adding the virtual channel in the local database for use in playing the virtual channel. In addition, in step S240, the original programs of the virtual channel can be replaced by many equivalent manners: for example, the original programs of the virtual channel are removed during the execution of the method of FIG. 5; that is, the program attribute data for the programs of the virtual channel are removed, or the program attribute data are reserved but the field of "associated channel identity code" is set to a code indicating an an undefined state. In this way, when the second local search result and the second external search result are set to be the programs of the virtual channel, the "replacement" is done (i.e., the programs of the virtual channel are updated). Hence, step S240 can cover various equivalent manners for implementation. Besides, after the update of the virtual channel, a message may be selectively displayed (e.g., by a window or other way) to inform the user of a virtual channel being updated.

In some other embodiments, the user can further collect various videos such as the virtual channel on a specific topic, any channel or program in a same virtual channel, which is referred to as a personal virtual channel, or "My Virtual Channel". As an example during the execution of step S160 of FIG. 1, when the command detection unit 150 detects the first selection indicating addition to a personal virtual channel, the processing unit 130 is further operative to set the virtual channel to be a program of the personal virtual channel. In practical applications, a remote controller or user interface can be configured for an item for setting "My Virtual Channel" or configured for activation of a selection for setting "My Virtual Channel" by some kind of sound, movement of a hand or gesture.

Figure 6:
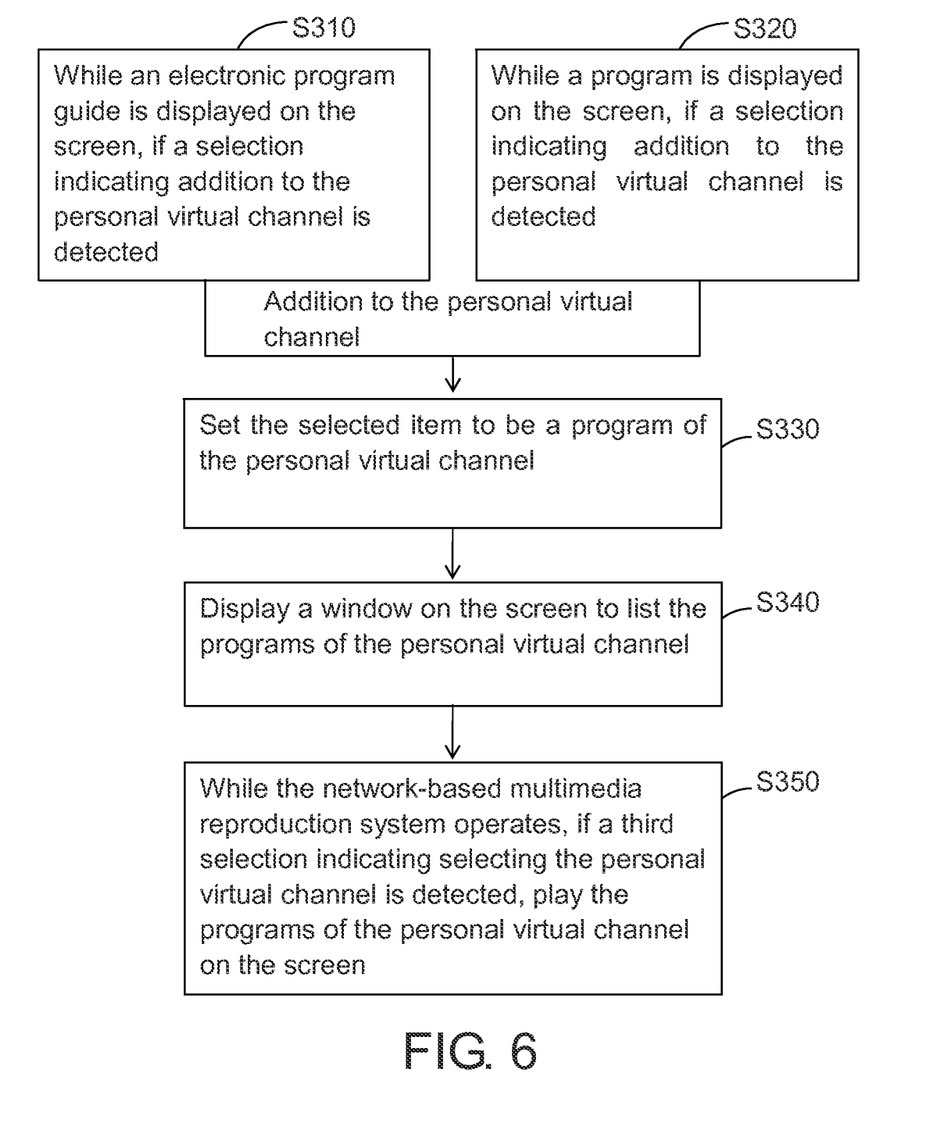
FIG. 6 is a flowchart of another embodiment of a method for virtual channel management.

Referring to FIG. 6, a flowchart illustrates another embodiment of a method for virtual channel management.

Figure 7:
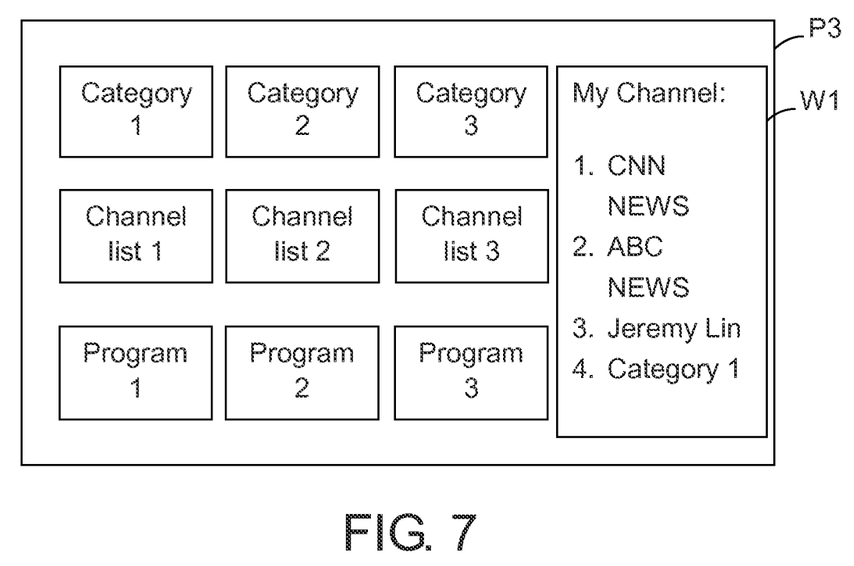
FIG. 7 is a schematic diagram illustrating an embodiment of adding an item from an electronic program guide to a personal virtual channel by using a network-based multimedia reproduction system.

As shown in step S310, while the display unit 110 displays an electronic program guide (EPG), when the command detection unit 150 detects a selection indicating addition to the personal virtual channel, as shown in step S330, the processing unit 130 is further operative to set a selected item from the electronic program guide to be a program of the personal virtual channel. As illustrated in FIG. 7, the electronic program guide in a screen P3 presents a plurality of program categories, channel lists, and programs, and the selected item is one of the program categories, channel lists, and programs.

As shown in step S320, while the display unit 110 displays a program (e.g., a movie being displayed indicated by a screen P4 of FIG. 8), when the command detection unit 150 detects a selection indicating addition to the personal virtual channel, as shown in step S330, the processing unit 130 is further operative to set the displayed program to be a program of the personal virtual channel.

Figure 8:
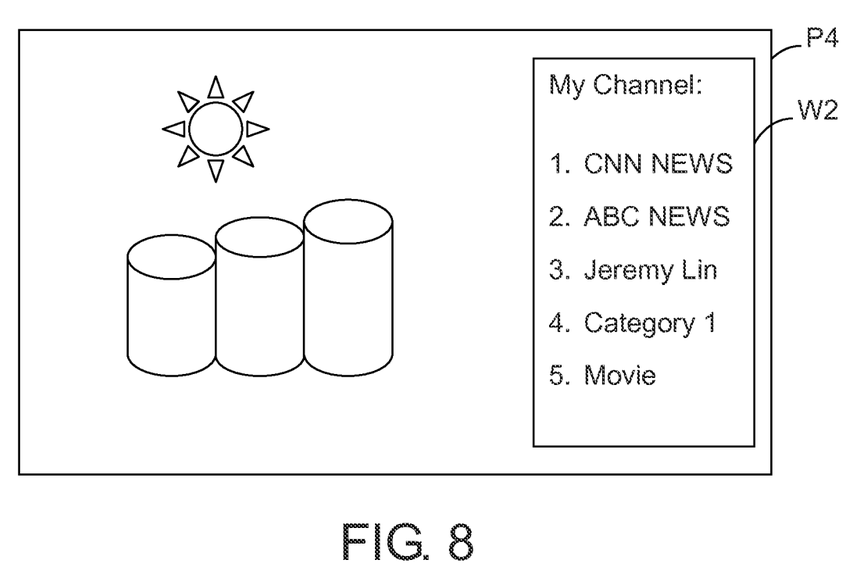
FIG. 8 is a schematic diagram illustrating an embodiment of adding a program which is playing to the personal virtual channel by using the network-based multimedia reproduction system.

As shown in step S340, in response to the selection indicating addition to the personal virtual channel, the processing unit 130 is further operative to enable the display unit 110 to display a window to list the programs of the personal virtual channel. As illustrated in FIG. 7 or 8, windows W1 or W2 are shown for inform the user of the current state of the personal virtual channel, or for editing and so on. Besides, step S340 can executed optionally. Step S340 may be implemented to optionally proceed to displaying the previous screen; for example, after displaying the window W1 or W2 for a period of time (e.g., a few seconds) or after the user indicates a confirmation indication, the window W1 or W2 disappears.

Further, while the network-based multimedia reproduction system 100 operates, when the command detection unit 150 detects a third selection indicating selecting the personal virtual channel, the processing unit 130 is further operative to make the display unit 110 to play the program content of the personal virtual channel; for example, playing the programs one by one, or displaying the programs of the personal virtual channel for selection by the user and then playing the selected program.

Other embodiments provide a computer or computing device readable storage medium having stored program code, or one or more program or program modules. For example, the steps in FIG. 3, 5, or 6 can be implemented as program modules. In an example, steps S120 and S130 can be implemented as a program search module (or component); steps S140 and S150 can be implemented as a program arrangement module (or component). When being executed by a network-based multimedia reproduction system, one or more program modules cause the network-based multimedia reproduction system to perform the method for virtual channel management according to the embodiment of FIG. 3, 5, or 6 or other combination of the embodiment. The readable information storage medium in each of the embodiments can be implemented by, without limitation to, an optical information storage medium, a magnetic information storage medium or a memory, such as a memory card, firmware, ROM or RAM, or built-in memory in a programmable microcontroller.

The embodiments of a method for virtual channel management and a network-based multimedia reproduction system are provided above. By the implementation of the technology of a virtual channel on a specific topic or a personal virtual channel, the network-based multimedia reproduction system enables the user to set personalized channels. On one hand, this facilitates the users' operations for switching and viewing; on the other hand, the viewing mode for the user is changed from a mode of passively viewing the content by the channel providers to a mode according to the personal ways and preferences. As such, the network-based multimedia reproduction system such as a smart television can be more convenient and suit the users, thus leading to better usage experiences.

While the invention has been described by way of example and in terms of the preferred embodiments, it is to be understood that the invention is not limited thereto. On the contrary, it is intended to cover various amendments and similar arrangements and procedures, and the scope of the appended claims therefore should be accorded the broadest interpretation so as to encompass all such amendments and similar arrangements and procedures.

What is claimed is:

1. A method for virtual channel management, for managing channel content in a network-based multimedia reproduction system, the method comprising:
   detecting a command including a keyword;
   searching local program data for any program satisfying a first search criterion to obtain a local search result, and searching for any external network video content satisfying the first search criterion to obtain an external search result, wherein the first search criterion includes the keyword;
   combining the local search result and the external search result to generate a program list accordingly;
   presenting the program list on a screen of the network-based multimedia reproduction system, wherein the program list includes one or more programs satisfying the keyword;
   if a first selection indicating addition of new virtual channel is detected during the presenting of the program list, adding and setting a virtual channel of the network-based multimedia reproduction system for displaying the program list, wherein program content of the virtual channel is content of the program(s) of the program list satisfying the first search criterion and the virtual channel is associated with a channel identity code; and
   while the network-based multimedia reproduction system operates, if a second selection indicating selecting the virtual channel associated with the channel identity code is detected, playing the program content of the virtual channel on the screen of the network-based multimedia reproduction system.

2. The method according to claim 1, wherein the virtual channel is associated with a piece of channel attribute data of the network-based multimedia reproduction system, the piece of channel attribute data includes the channel identity code and the keyword; the programs of the program list satisfying the keyword are associated with a plurality of pieces of program attribute data, when the program list is set to be the virtual channel of the network-based multimedia reproduction system, the pieces of program attribute data each are set to include the channel identity code.

3. The method according to claim 1, further comprising:
   in response to an update event:
   obtaining at least the keyword associated with the virtual channel;
   searching the local program data for any program satisfying a second search criterion to obtain another local search result, and searching for any external network video content satisfying the second search criterion to obtain another external search result, wherein the second search criterion includes the keyword; and
   using the another local search result and the another external search result to update the programs of the virtual channel instead of the original programs of the virtual channel, wherein each piece of program attribute data of the programs of the virtual channel is set to include the channel identity code.

4. The method according to claim 1, further comprising:
   if the first selection indicating addition to a personal virtual channel of the network-based multimedia reproduction system is detected during the presenting of the program list, setting the virtual channel to be a program of the personal virtual channel.

5. The method according to claim 4, further comprising:
   while an electronic program guide is displayed on the screen, if a selection indicating addition to the personal virtual channel is detected, setting a selected item from the electronic program guide to be a program of the personal virtual channel, wherein the electronic program guide presents a plurality of program categories, channel lists, and programs, and the selected item is one of the program categories, channel lists, and programs.

6. The method according to claim 5, further comprising:
   in response to the selection indicating addition to the personal virtual channel, displaying a window on the screen to list the programs of the personal virtual channel.

7. The method according to claim 4, further comprising:
   while a program is displayed on the screen, if a selection indicating addition to the personal virtual channel is detected, setting the displayed program to be a program of the personal virtual channel.

8. The method according to claim 7, further comprising:
   in response to the selection indicating addition to the personal virtual channel, displaying a window on the screen to list the programs of the personal virtual channel.

9. The method according to claim 4, further comprising:
   while the network-based multimedia reproduction system operates, if a third selection indicating selecting the personal virtual channel is detected, playing the program content of the personal virtual channel.

10. The method according to claim 1, further comprising:
    in response to an update event:
    obtaining the keyword and at least one providing entity associated with the virtual channel;
    searching the local program data for any program satisfying a second search criterion to obtain another local search result, and searching for any external network video content satisfying the second search criterion to obtain another external search result, wherein the second search criterion includes the keyword and the least one providing entity; and
    updating the programs of the virtual channel with the another local search result and the another external search result, wherein each piece of program attribute data of the programs of the virtual channel is set to include the channel identity code.

11. The method according to claim 10, wherein the at least one providing entity is a video content provider, an author of a video content, or a reporter for a video content.

12. A non-transitory computer readable storage medium having stored program code of one or more program modules, which, when executed by a network-based multimedia reproduction system, cause the network-based multimedia reproduction system to perform a method for virtual channel management, wherein the method comprises
    detecting a command including a keyword;
    searching local program data for any program satisfying a first search criterion to obtain a local search result, and searching for any external network video content satisfying the first search criterion to obtain an external search result, wherein the first search criterion includes the keyword;

combining the local search result and the external search result to generate a program list;

presenting the program list on a screen of the network-based multimedia reproduction system, wherein the program list includes one or more programs satisfying the keyword;

if a first selection indicating addition of new virtual channel is detected during the presenting of the program list, adding and setting a virtual channel of the network-based multimedia reproduction system for displaying the program list, wherein program content of the virtual channel is content of the program(s) of the program list satisfying the first search criterion and the virtual channel is associated with a channel identity code; and while the network-based multimedia reproduction system operates, if a second selection indicating selecting the virtual channel associated with the channel identity code is detected, playing the program content of the virtual channel on the screen of the network-based multimedia reproduction system.

13. A network-based multimedia reproduction system, comprising:
a command detection unit;
a display unit;
a storage unit;
a network unit; and
a processing unit, coupled to the command detection unit, the display unit, the storage unit, and the network unit, wherein in response to a command including a keyword, detected by the command detection unit, the processing unit is operative to search local program data for any program satisfying a first search criterion to obtain a local search result, and search for any external network video content satisfying the first search criterion to obtain an external search result, wherein the first search criterion includes the keyword; and
wherein the processing unit is operative to combine the local search result and the external search result to generate a program list accordingly;
the display unit is operative to present the program list, wherein the program list includes one or more programs satisfying the keyword;
if a first selection indicating addition of new virtual channel is detected during the display unit presenting the program list, the processing unit is operative to add and set a virtual channel of the network-based multimedia reproduction system for displaying the program list, wherein program content of the virtual channel is content of the program(s) of the program list satisfying the first search criterion and the virtual channel is associated with a channel identity code; and
while the network-based multimedia reproduction system operates, if a second selection indicating selecting the virtual channel associated with the channel identity code is detected, the network-based multimedia reproduction system uses the display unit to play the program content of the virtual channel.

14. The system according to claim 13, wherein the virtual channel is associated with a piece of channel attribute data of the network-based multimedia reproduction system, and the piece of channel attribute data includes the channel identity code and the keyword; the programs of the program list satisfying the keyword are associated with a plurality of pieces of program attribute data, and when the program list is set to be the virtual channel of the network-based multimedia reproduction system, the pieces of program attribute data each are set to include the channel identity code.

15. The system according to claim 13, wherein in response to an update event, the processing unit is further operative to:
obtain at least the keyword associated with the virtual channel;
search the local program data for any program satisfying a second search criterion to obtain another local search result, and search for any external network video content satisfying the second search criterion to obtain another external search result, wherein the second search criterion includes the keyword; and
update the programs of the virtual channel with the another local search result and the another external search result, wherein each piece of program attribute data of the programs of the virtual channel is set to include the channel identity code.

16. The system according to claim 13, wherein when the command detection unit detects the first selection indicating addition to a personal virtual channel of the network-based multimedia reproduction system while the display unit presents the program list, the processing unit is further operative to set the virtual channel to be a program of the personal virtual channel.

17. The system according to claim 16, wherein while the display unit displays an electronic program guide, when the command detection unit detects a selection indicating addition to the personal virtual channel, the processing unit is further operative to set a selected item from the electronic program guide to be a program of the personal virtual channel, wherein the electronic program guide presents a plurality of program categories, channel lists, and programs, and the selected item is one of the program categories, channel lists, and programs.

18. The system according to claim 17, wherein in response to the selection indicating addition to the personal virtual channel, the processing unit is further operative to enable the display unit to display a window to list the programs of the personal virtual channel.

19. The system according to claim 16, wherein while the display unit displays a program, when the command detection unit detects a selection indicating addition to the personal virtual channel, the processing unit is further operative to set the displayed program to be a program of the personal virtual channel.

20. The system according to claim 19, wherein in response to the selection indicating addition to the personal virtual channel, the processing unit is further operative to enable the display unit to display a window to list the programs of the personal virtual channel.

21. The system according to claim 16, wherein:
while the network-based multimedia reproduction system operates, when the command detection unit detects a selection indicating selecting the personal virtual channel, the processing unit is further operative to make the display unit to play the program content of the personal virtual channel.

22. The system according to claim 13, wherein in response to an update event, the processing unit is further operative to:
obtain the keyword and at least one providing entity associated with the virtual channel;
search the local program data for any program satisfying a second search criterion to obtain another local search result, and search for any external network video content satisfying the second search criterion to obtain another external search result, wherein the second search criterion includes the keyword and the least one providing entity; and update the programs of the virtual channel with the another local search result and the another external search result, wherein each piece of program attribute data of the programs of the virtual channel is set to include the channel identity code.

23. The system according to claim 22, wherein the at least one providing entity is a video content provider, an author of a video content, or a reporter for a video content.

24. The system according to claim 13, wherein the network-based multimedia reproduction system is a smart television.

25. The system according to claim 24, wherein the command detection unit is operative to detect a command including the keyword in a manner of one of signal receiving, voice recognition, and video recognition.

* * * * *